UNITED STATES PATENT OFFICE.

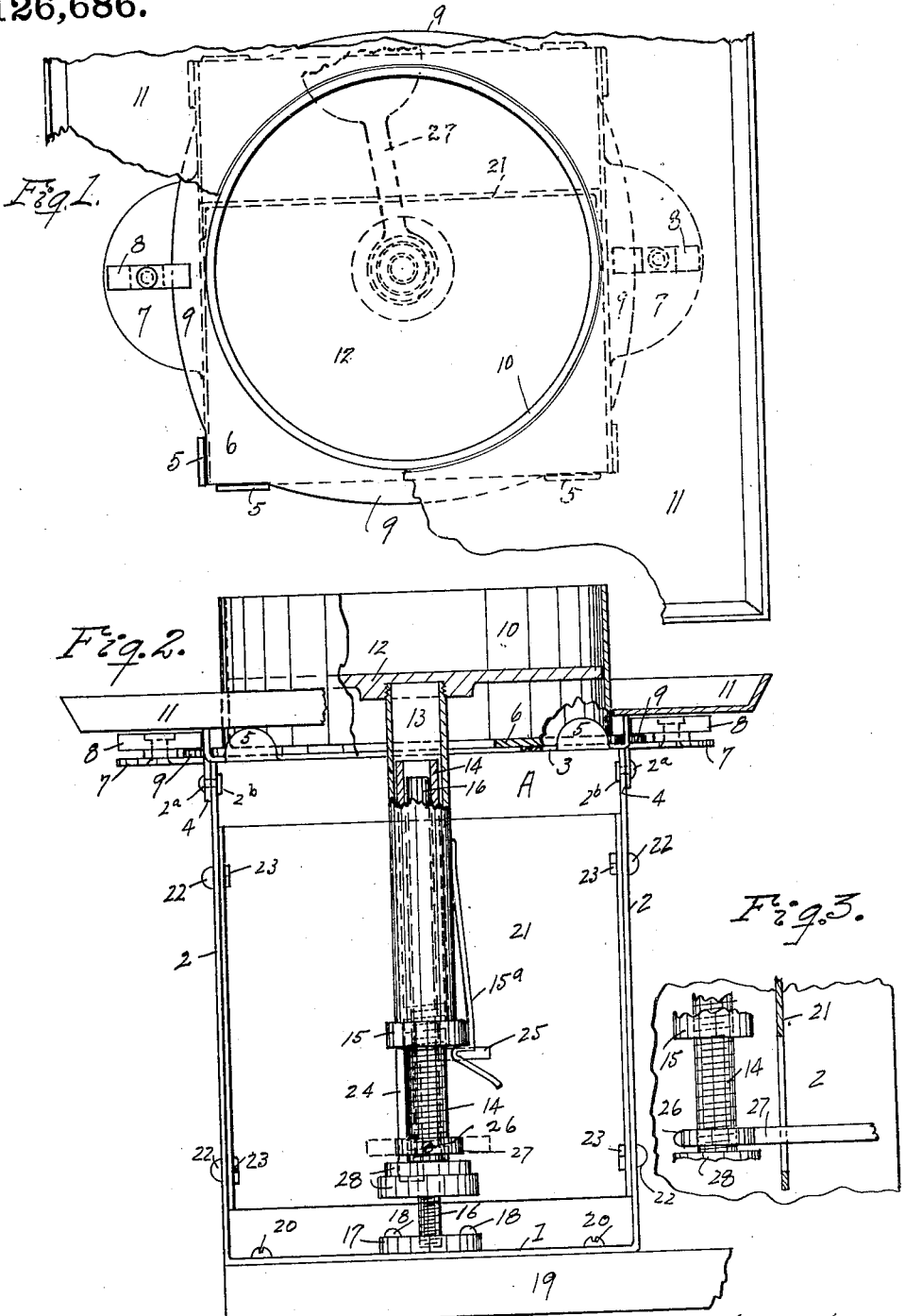

WILLIAM G. BARNES, OF SEATTLE, WASHINGTON.

MOLD.

1,126,686.   Specification of Letters Patent.   Patented Feb. 2, 1915.

Application filed November 10, 1913. Serial No. 800,122.

*To all whom it may concern:*

Be it known that I, WILLIAM G. BARNES, a citizen of the United States, and a resident of Seattle, in the county of King and State of Washington, have invented certain new and useful Improvements in Molds, of which the following is a specification.

This invention relates to molds and particularly to such devices as are adapted to the molding of food stuffs preparatory to cooking, or to the molding of the same, whether cooked or uncooked, into suitable batches for sandwiches and the like.

The principal object of the invention is to provide such a device which is of simple construction, and in which the parts which require frequent washing may be quickly and conveniently separated from each other for that purpose.

Other objects will appear as the invention is more fully described in the following specification and illustrated in the accompanying drawings, in which—

Figure 1 is a fragmentary plan view of the device. Fig. 2 is a similar view in central vertical section. Fig. 3 is a fragmentary detail view, partly in section, showing a portion of the adjusting means.

Referring now more particularly to the drawings, reference numeral A designates, in a general way, a boxlike frame, preferably of sheet metal and formed into the bottom portion 1 and upturned sides 2, to which is secured the top 3, by any suitable means, such as the ears 4 turned downwardly from the said top, and the machine screws 2ª and nuts 2ᵇ. Upwardly turned from the said top are the ears 5 at each corner, which are adapted to hold the plate 6 in place, as shown. Extending from the plate 3 are the wings 7, upon which are the turnbuttons 8, the inner ends of which are adapted to be swung around over the projections 9 of the plate 6, so as to removably secure that plate to the plate 3. Projecting upwardly from the plate 6 is the cup 10, the said plate forming the true bottom of the said cup, the top of the same being open, as shown. Supported upon the ears 5 is the pan 11, through the bottom of which is a circular opening which loosely fits around the cup 10. Within the said cup loosely fits a disk 12, to which is rigidly secured the upper end of a sleeve 13, which slidably passes through both of the plates 3 and 6, and within which telescopes one end of the tube 14 whose lower end is threaded, as shown, and has fitted upon it the circular nut 15 with which is adapted to coöperate the spring catch 15ª which is secured to the sleeve 13. Within the tube 14 slidably fits the stem 16, the lower end of which is rigid with the plate 17 which is firmly secured, as by the screws 18, to the bottom 1, and the said bottom is firmly secured to the base plate 19 by means of the screws 20. In use, the said base plate may be removably secured to a table by means of any approved form of clamp. Extending from one of the sides 2 to the other is a partition 21, secured to the said sides, by means of the screws 22 and nuts 23. In the said partition is a vertical slot 24, communicating with the upper end of which is a kerf 25. By means of a binding screw 26 a handle 27 is adjustably secured to the tube 14, and the said handle projects through the slot 24, so that by lifting upon the free end of the said handle the tube 14, sleeve 13 and its disk 12 may be raised until the said handle is arrested by contact with the upper end of the said slot, when the said handle, due to the kerf 25, may be turned to the right (as viewed in Fig. 2) about the center represented by the stem 16, and when the handle is thus in the said kerf the parts just mentioned will, of course, be held at a corresponding height, and, obviously, a reverse movement of the handle will allow the same to descend to the bottom of the slot 24. In order to vary this downward movement of the parts, I provide the jam nuts 28 which are mounted upon the stem 16, the lower end of the said stem being threaded as shown, for this purpose, and for the accommodation of the nut 15, as the interior of the tube 14 is smooth.

The operation of the device is as follows:—The thickness of the batch about to be molded having been determined, the jam nuts 28 are adjusted to allow the disk 12 to descend within the cup 10 a distance corresponding to that of the thickness of the batch. Dry flour, meal, crumbs or the like is then sprinkled into the cup to prevent sticking of the food to the same, the food then introduced into the cup and any suitable form of rolling pin passed over the top of the cup which, of course, compresses the food within the cup and also at the same time cuts off the surplus food at the circular edges of the cup, the unused food falling into the pan 11. The handle 27 is now raised and turned into the kerf 25, as already described, the disk 12 being then, of course, just flush with the circular edges of the cup 10, and the completed mold or cake ready to be lifted off of the disk by any approved means, such as a cake turner, or the like. It is desirable that the disk 12 be perfectly flush with the circular edges of the cup 10 when the completed mold is ready to be removed, and a nice adjustment in this respect may be accomplished by turning the nut 15, as will be understood. All the parts are quickly separable and may be. therefore, thoroughly and conveniently cleansed after use, to do which it is only necessary to lift the disk 12 and its attached part, the spring catch 15ª yielding and allowing such movement; lift the pan 9; turn the buttons 8 and lift the plate 6 and its cup 10. The use of my device insures a perfectly uniform cake or mold with a resultant exact basis for calculation of the cost of each cake, and, if the cakes are to be cooked after they have been molded, tends to insure a uniform color and appearance thereof, due to the fact that the moisture in all of the cakes is the same because of their uniform size.

I have shown but a single mold, but in practice I prefer to have a number of devices arranged either in a single line or row, or in parallel rows or lines, or in any similar manner so as to permit of the tops of the cups or matrices 10 to be pasesd over at one operation by the rolling pin, as already indicated in connection with a single one of the devices.

While I have shown a particular embodiment of my invention, I am aware that many structural changes therein will readily suggest themselves to others without departing from the spirit and scope of the invention, and I desire to avoid being limited to the exact form shown and described.

What I claim as new, is—

In a molding device for plastic food stuffs having a movable bottom for its matrix portion, the combination of a rectangular sheet-metal base frame, a partition within the said frame having a slot and communicating kerf therein, means for adjusting the said movable bottom with respect to the matrix, said means including a handle which projects through the said slot and is adapted to be moved therein, sleeved connections between the said handle and the said movable bottom, a threaded stem rigid with the base portion and which coöperates with the said sleeved connections, and an adjusting nut upon the stem; means for yieldingly and removably holding the movable bottom in place upon the said stem, comprising a spring catch mounted upon the sleeved connections and adapted to be snapped over the said adjusting nut; means for removably securing the matrix portion to the said base frame, including a plate extending laterally from the bottom of the matrix portion and turn-buttons upon the said base frame.

WILLIAM G. BARNES.

Witnesses:
 FRED P. GORIN,
 R. D. SMALLEY.

Copies of this patent may be obtained for five cents each, by addressing the "Commissioner of Patents, Washington, D. C."